Jan. 15, 1924.
W. G. ODATEY
TRAP
Filed Sept. 15, 1922
1,481,222
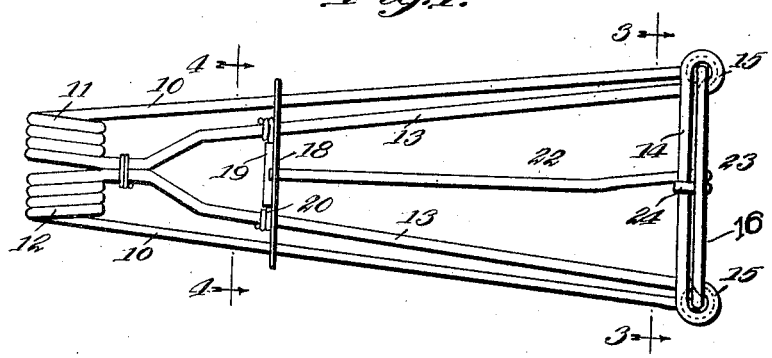
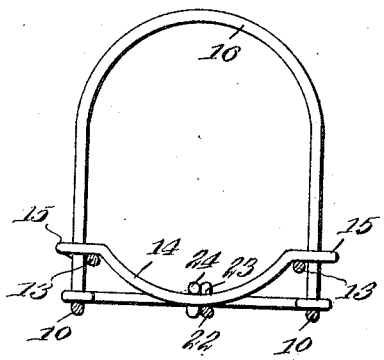
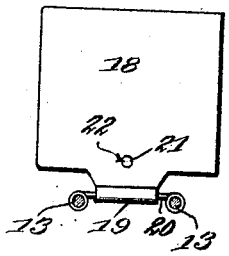
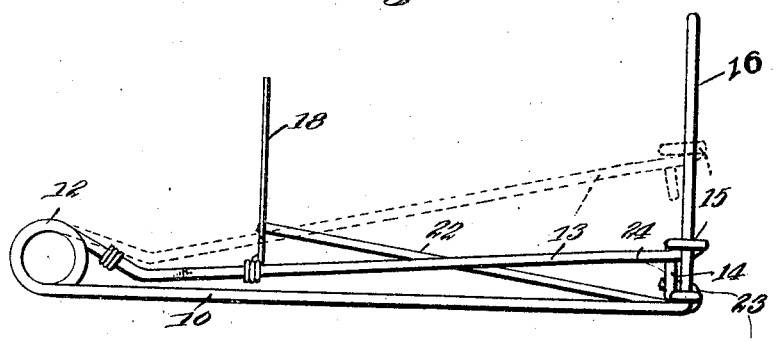
W. G. Odatey
INVENTOR
BY Victor J. Evans
ATTORNEY Patented Jan. 15, 1924.

1,481,222

UNITED STATES PATENT OFFICE.

WILLIAM G. ODATEY, OF INGLEWOOD, CALIFORNIA.

TRAP.

Application filed September 15, 1922. Serial No. 588,447.

*To all whom it may concern:*

Be it known that I, WILLIAM G. ODATEY, a citizen of Japan, residing at Inglewood, in the county of Los Angeles and State of California, have invented new and useful Improvements in Traps, of which the following is a specification.

This invention has for its object the provision of a gopher trap designed to be tripped by the gopher as the latter enters the trap, releasing a spring actuated jaw which cooperates with a stationary member to squeeze the gopher about the abdomen in a manner to prevent escape of the animal.

The nature and advantages of the invention will be better understood when the following detailed description is read in connection with the accompanying drawing, the invention residing in the construction, combination, and arrangement of parts as claimed.

In the drawing forming part of this application, like numerals of reference indicate similar parts in the several views, and wherein:—

Figure 1 is a plan view of the trap showing the same set.

Figure 2 is a side view showing the active position of the movable jaw with relation to the stationary member, between which the animal is gripped.

Figure 3 is a view taken on the line 3—3 of Figure 1.

Figure 4 is a view taken on the line 4—4 of Figure 1.

The body of the trap is formed from a single length of suitable wire, and includes the spaced portions 10 which terminate at corresponding ends to provide resilient coils 11 and 12 respectively. The adjacent convolutions of these coils are extended to provide spaced members 13 which lie above the members 10, and the members 13 unitedly define what will be hereinafter referred to as a movable jaw. The members 13 are connected together at their forward ends by a curved portion 14 formed to provide loops 15 for a purpose to be presently described. The forward ends of the portions 10 are connected by a substantially arch-shaped member 16, and the loops 15 of the movable jaw slide upon the sides of the member 16 as illustrated. The movable jaw occupies a position immediately above the portions 10 when the trap is set as shown in Figure 1, and incident to the release of said jaw, it is forcibly moved to the position illustrated in Figure 2, in which position the member 14 is moved to grip the animal between this member and the arch-shaped member 16. The loops 15 are large enough to allow the curved portion 14 to move in an arc. When the trap is set, the member 14 is disposed to provide a large entrance opening for the animal, which opening is defined by the space between the member 14 and the top of the arch-shaped member 16. It is of course to be understood that the ends of the wire from which the trap is formed can be joined or secured together in any suitable manner.

For the purpose of setting the trap, I make use of a plate 18 which is pivoted as at 19 upon a transverse member 20 which connects the members 13 of the movable jaw. This plate 18 is provided with an opening 21 to receive the free end of a pivoted element 22. The element 22 consists of a length of wire formed at one end to provide an eye 23, which is pivoted upon the bottom of the arch-shaped member 16, and the terminal of this eye is extended as at 24 for a purpose to be presently set forth. When the movable jaw is arranged in its set position, the terminal of the eye indicated at 24 engages the transverse member 14 of the jaw, while the element 22 is arranged so that the free end of this element is received by the opening 21 of the plate 18. When the parts are thus arranged, the plate 18 is vertically disposed, so that when the animal passes through the entrance opening of the trap above described, and contacts the plate 18, the latter is swung upon its pivot away from the element 22, whereupon the movable jaw is forcibly moved to its active position as shown in Figure 2. The trap is not only simple in construction, but it is very sensitive and efficient in operation.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

A trap of the character described comprising a base formed from a single length of wire and including spaced side members arranged in divergent relation, an arched shaped member rising from the base at one end thereof and disposed at a right angle thereto, said arched shaped member constituting a fixed jaw, the other end of said base terminating to provide resilient coils, the adjacent convolutions of which are extended to provide the movable jaw, said movable jaw including spaced members terminating at their forward ends to provide eyes slidably mounted on the parallel portions of the fixed jaw, said eyes being extended to provide a transverse member to connect the spaced members of the movable jaw at one end thereof, and tripping means for holding the movable jaw in a set position.

In testimony whereof I affix my signature.

WILLIAM G. ODATEY.